Patented Mar. 12, 1940

2,193,026

UNITED STATES PATENT OFFICE

2,193,026

RESIN AND PROCESS OF PRODUCING

Lucius Coleman Hall, Hattiesburg, Miss., assignor to Hercules Powder Company, Wilmington, Del., a corporation of Delaware No Drawing. Application January 31, 1936, Serial No. 61,745

11 Claims. (Cl. 260—107)

This invention relates to a new and improved resin and process of producing same, and more particularly to a new and improved resin derived from resinous wood and a method of producing the same.

Heretofore rosins produced from resinous wood have been known, but all have suffered from the disadvantage, for certain purposes, of being soluble in gasoline or other petroleum hydrocarbons. My improved resin overcomes this disadvantage in that it is practically insoluble in gasoline and other petroleum hydrocarbons, contains no water-soluble substances, and can be used for purposes, among others, where gasoline-insolubility is desired.

The exact chemical composition of my improved resin is unknown to me. I have determined that it has a methoxy content of about 3 to 6%, which distinguishes it from oxidized wood rosin (0.3 to 0.4% methoxy) and gum rosin (0.1 to 0.2% methoxy). I have also determined that my improved resin contains among other things, various oxidized resin acids, oxidized terpenes, polyphenols, polymerized terpenes, and highly complex ligneous substances, but its accurate analysis has so far been impossible, so that I shall hereinafter define such resin by its method of preparation.

Heretofore, gasoline has been widely used for the extraction of rosin from pine wood. The total resinous material from such extraction is known as FF rosin. A solvent for rosin which comprises a coal tar hydrocarbon, such as benzol, toluol, xylol, etc., has the property of extracting from pine wood, e. g., wood of the long leaf pine, resinous material not extracted from such wood by the use of gasoline or other light petroleum hydrocarbon, and hence will extract from such wood a larger quantity of resinous material. For example, when extracting pine wood chips by the use of gasoline, the resinous extract will amount to about 0.9 barrel per ton of wood, whereas with the use of benzol, toluol, xylol, etc., I am able to extract from a ton of the same grade of pine wood about 1.13 barrels of resin.

In accordance with the method embodying this invention, pine wood is extracted with a solvent capable in the cold of extracting, from the pine, wood rosin and resinous substances other than rosin. The solvent is evaporated from the extract leaving the extracted rosin and other resinous substances as a solid residue, which is then extracted with a solvent for rosin which will not dissolve the other resinous components of the original extract or solid residue and which are separated from the extract and comprise the improved resin in accordance with this invention.

In proceeding in accordance with the method of this invention, the pine wood may be steamed before extraction or may be extracted without previous steaming. Where the pine wood is not previously steamed, turpentine and pine oil will usually be extracted by the solvent used for extracting rosin and other resinous substance. In some cases even though the wood be previously steamed, some turpentine and pine oil remaining in the wood will be extracted. Where turpentine and pine oil are present in the extract, they will be evaporated off in reduction of the extract to solid residue for extraction with a light petroleum hydrocarbon.

As illustrative of practical procedure for carrying out the method according to this invention, pine wood, preferably that from the Southern long leaf pine, with or without preliminary steaming of the wood chips to remove their turpentine and pine oil content, is extracted with a solvent which is a solvent for the FF rosin, turpentine, and pine oil contained in the wood chips, and which is also a solvent for other complex substances contained in the wood chips. Such a solvent may be, for example, a coal tar hydrocarbon, such as benzol, toluol, xylol, etc. The extraction may be accomplished by flooding the pine wood chips with the solvent, with or without the use of heat.

When the extraction of the chips has been sufficient, the coal tar hydrocarbon solution of matter extracted from the pine wood chips is drawn off the wood chips and the solvent evaporated and re-used in the process, if desired. Evaporation of the solvent leaves turpentine, pine oil, rosin and my improved resin, all in admixture. The turpentine and pine oil are then removed by distillation, leaving a dark colored residue comprising a mixture of FF wood rosin and my improved resin. This resinous mixture is then extracted with a substance which is a solvent for the FF rosin but not a solvent for my improved resin. As such a solvent I may use, for example, and preferably at an elevated temperature, petroleum hydrocarbons such as petroleum ether, gasoline, heptane, hexane, etc., or an operable equivalent therefor.

When the residue from the coal tar hydrocarbon extraction has been sufficiently extracted by the petroleum hydrocarbon, a dark colored, resinous substance remains, which, when freed from occluded gasoline, is the object of this invention.

In the extraction by gasoline of the above mixture of FF rosin and my improved resin, I may wash the hot gasoline extract obtained with water, preferably cold water, or I may cool the hot gasoline solution of resins, further to precipitate any of my improved resin which may have been held in solution.

After preparation of my improved resin, as outlined above, I may further wash it with fresh gasoline to remove from my improved resin any FF rosin which may have been occluded therein.

The gasoline extract from extraction of the mixture of FF rosin and my improved resin contains FF rosin. This gasoline solution may be evaporated to recover the gasoline, for reuse if desired, leaving FF rosin of marketable grade.

As a further identification of my improved resin, I may point out that by using the process described above, 50 to 150 pounds thereof per ton of pine wood may be produced, depending upon the details (time, temperature, etc.,) of the separation of the FF rosin from my improved resin. A typical sample of my improved resin will have the following characteristics: melting point, A. S. T. M. drop method, 125° C., acid number 100, naphtha-insoluble matter 98%, petroleum ether-insoluble matter 96%, gasoline-soluble 8%, water-soluble 0%.

In the above, the naphtha-insoluble matter is determined by adding five grams of powdered resin to 10 cc. of V. M. & P. naphtha, 90% of which distills between 100° and 150° C., specific gravity about 0.75, warming to dissolve the resin, boiling under reflux 10 minutes, with shaking, cooling, adding 28 cc. of the same grade of naphtha while shaking, cooling to 20° C. for one hour, filtering the naphtha solution with insoluble matter in suspension through a tared Gooch crucible, using 25 cc. of the naphtha to wash out the flask or other container, and washing the precipitate with 50 cc. of the naphtha, drying over night at 120–125° C., and weighing.

In the above example of characteristics of my improved resin, the gasoline-soluble matter is determined by adding to 50 grams of the resin, 100 cc. of gasoline, boiling under reflux for 20 minutes, decanting into a separatory funnel, and repeating until four washes have been made, then washing the gasoline solution in the separatory funnel with cold water, cooling to 20° C., drawing off into a distillation flask, concentrating to 50–100 cc. volume, evaporating to constant weight, to give the gasoline-soluble material.

The discrepancy between the tests is due to the empirical nature of the determination, occluded solvent, and suspended substances.

My improved resin, produced, for example, by the method described above, will be found adaptable for use in lacquers, varnishes, cable covering compositions, compositions for impregnating electrical windings and coils, etc., where gasoline-insolubility is a desirable asset. Depending upon the particular use to which the resin is to be put, my improved resin may be compounded with various plasticizers, diluents, fillers, pigments, etc., and solvents for such resin, e. g., ethyl alcohol, ethyl acetate, ethylene dichloride, etc.

It will be understood that the method in accordance with my invention does not require for its practical adaptation the use of any particular form of apparatus, and it will be understood that the examples given herein for the carrying out of the method are for illustrative purposes and are not to be construed as limitations upon the scope of my invention, the details involved in the practice of which may be varied within the scope of the invention.

What I claim and desire to protect by Letters Patent is:

1. The method of producing a resin characterized by freedom from wood rosin, solubility in alcohol, substantial insolubility in gasoline, a methoxy content of about 3% to about 6%, an acid number of about 100, a naphtha insolubility of about 98% and a melting point of about 125° C., which includes extracting pine wood with a coal tar hydrocarbon, evaporating the coal tar hydrocarbon and other volatile constituents of the extract from the extract to produce a solid residue, extracting rosin from said residue with a light petroleum hydrocarbon, and separating the rosin extract from the remaining residue which is substantially insoluble in light petroleum hydrocarbons and recovering the remaining residue which has the aforesaid and desired characteristics.

2. The method of producing an alcohol-soluble resin which includes steaming pine wood chips to remove volatile substances therefrom, extracting the steamed wood chips with a coal tar hydrocarbon, evaporating the coal tar hydrocarbon and other volatile constituents of the extract from the extract to produce a solid residue, extracting rosin from said residue with a light petroleum hydrocarbon, and separating the extract from the light petroleum hydrocarbon-insoluble components of the original extraction of pine wood.

3. The method of producing a resin which is soluble in alcohol but substantially insoluble in light petroleum hydrocarbons, which includes extracting pine wood with a coal tar hydrocarbon to produce an extract containing coal tar hydrocarbon, volatile materials such as turpentine, and normally solid resinous materials, evaporating the coal tar hydrocarbon and volatile portions of the extract to produce a solid residue, extracting rosin from said residue with a light petroleum hydrocarbon, separating the said rosin extract from the then remaining insoluble residue and recovering the said insoluble residue which has the aforesaid and desired characteristics.

4. The method of producing a resin which is substantially insoluble in light petroleum hydrocarbons and which has a methoxy content of between about 3% to about 6%, which includes extracting pine wood with a coal tar hydrocarbon to produce an extract containing coal tar hydrocarbon, other volatile substances such as turpentine and pine oil, rosin, and a solid residue, removing the coal tar hydrocarbon and other volatile materials to produce a mixture of rosin and said solid residue, extracting rosin from said mixture with a light petroleum hydrocarbon, and separating said rosin extract from said solid residue which has the aforesaid and desired characteristics.

5. The method of producing a resin which is soluble in alcohol but substantially insoluble in light petroleum hydrocarbons and which is characterized by a methoxy content of between about 3% to about 6%, which includes extracting pine wood with a coal tar hydrocarbon to produce an extract containing coal tar hydrocarbon, other volatile substances such as turpentine and pine oil, rosin, and a solid residue, evaporating the coal tar hydrocarbon and volatile portions of the said extract to produce a mixture of rosin and said solid residue, extracting rosin from said mixture with gasoline, and separating said gasoline extract from said solid residue which has the aforesaid and desired characteristics.

6. The method of claim 3 in which the coal tar hydrocarbon is toluol.

7. The product produced by the method of claim 2 and which is characterized by substantial insolubility in light petroleum hydrocarbons, solubility in alcohol, and by having a methoxy content of between about 3% to about 6%.

8. The product produced by the method of claim 3 and which is characterized by substantial insolubility in light petroleum hydrocarbons, solubility in alcohol, and by having a methoxy content of between about 3% to about 6%.

9. The product produced by the method of claim 5 and which is characterized by substantial insolubility in light petroleum hydrocarbons, solubility in alcohol, and by having a methoxy content of between about 3% to about 6%.

10. The product produced by the method of claim 11 and which is characterized by substantial insolubility in light petroleum hydrocarbons, solubility in alcohol, and by having a methoxy content of between about 3% to about 6%.

11. The method of producing a resin which is soluble in alcohol but substantially insoluble in light petroleum hydrocarbons, such as gasoline, which includes extracting pine wood with benzol to produce an extract containing benzol, volatile materials such as turpentine, and normally solid resinous materials, evaporating the benzol and volatile portions of the extract to produce a solid residue, extracting rosin from said residue with a light petroleum hydrocarbon, separating the said rosin extract from the then remaining insoluble residue and recovering the said insoluble residue which has the aforesaid and desired characteristics.

LUCIUS COLEMAN HALL.